(12) United States Patent
Bohrer et al.

(10) Patent No.: US 9,908,075 B2
(45) Date of Patent: Mar. 6, 2018

(54) GENERAL VENTILATION SYSTEM WITH AUTOMATIC CLEANING CYCLE

(71) Applicant: IVEC Systems, LLC, New Berlin, WI (US)

(72) Inventors: David Bohrer, Mukwonago, WI (US); Daniel Bohrer, Brookfield, WI (US); DuWayne Bohrer, Muskego, WI (US); Thomas Scott Rich, Waukesha, WI (US)

(73) Assignee: IVEC Systems, LLC, New Berlin, WI (US)

( * ) Notice: Subject to any disclaimer, the term of this patent is extended or adjusted under 35 U.S.C. 154(b) by 0 days.

(21) Appl. No.: 15/591,191

(22) Filed: May 10, 2017

(65) Prior Publication Data

US 2017/0239607 A1    Aug. 24, 2017

Related U.S. Application Data

(62) Division of application No. 14/790,887, filed on Jul. 2, 2015.

(Continued)

(51) Int. Cl.
| | |
|---|---|
| *B01D 46/46* | (2006.01) |
| *B01D 46/44* | (2006.01) |
| *B01D 46/42* | (2006.01) |
| *B01D 46/00* | (2006.01) |
| *F24F 3/16* | (2006.01) |
| *B01D 46/48* | (2006.01) |

(52) U.S. Cl.
CPC ......... *B01D 46/46* (2013.01); *B01D 46/0068* (2013.01); *B01D 46/0086* (2013.01);
(Continued)

(58) Field of Classification Search
CPC ............ B01D 46/0064; B01D 46/0067; B01D 46/0068; B01D 46/0071; B01D 46/0072; B01D 46/0075; B01D 46/0086; B01D 46/444; B01D 46/446; B01D 46/46; B01D 46/0001; B01D 46/48; F24F 3/1603; F24F 2003/1614; F24F 2003/1639
(Continued)

(56) References Cited

U.S. PATENT DOCUMENTS 1,118,044 A * 11/1914 Playter ............... B01D 46/0075
                                                              55/300
5,421,846 A *  6/1995 Klimczak ............ B01D 46/002
                                                              55/302

(Continued)

OTHER PUBLICATIONS

Declaration describing a 2011 product.
(Continued)

*Primary Examiner* — Robert Clemente
(74) *Attorney, Agent, or Firm* — Shane Delsman; Godfrey & Kahn, S.C.

(57) ABSTRACT

A general ventilation and air filtration system includes an air filtration control unit that monitors and controls an air flow through an air filter and maintains the air flow at a target velocity set point. The target velocity set point is maintained by monitoring and regulating the power of a motor powering a blower that generates an air flow through the air filtration system and through the air filter. By regulating the air flow and maintaining it in the target set point, power consumption and air filter life are significantly improved.

9 Claims, 8 Drawing Sheets

Related U.S. Application Data

(60) Provisional application No. 62/074,929, filed on Nov. 4, 2014.

(52) U.S. Cl.
CPC ....... *B01D 46/0095* (2013.01); *B01D 46/429* (2013.01); *B01D 46/444* (2013.01); *B01D 46/446* (2013.01); *B01D 46/48* (2013.01); *F24F 3/1603* (2013.01); *B01D 2279/50* (2013.01); *F24F 2003/1614* (2013.01); *F24F 2003/1639* (2013.01)

(58) Field of Classification Search
USPC .................................................. 55/298, 300
See application file for complete search history.

(56) References Cited

U.S. PATENT DOCUMENTS

| | | | | |
|---|---|---|---|---|
| 6,035,551 A | * | 3/2000 | Scheufler | ............... B01D 46/00 34/270 |
| 6,799,687 B1 | * | 10/2004 | Schon | .................. B01D 29/117 210/333.1 |
| 2012/0272669 A1 | * | 11/2012 | Blanton | .................... F25B 5/02 62/89 |

OTHER PUBLICATIONS

Article "Clearing the air for heavy welding; mining equipment fabricator integrates advanced fume filtration" by Tim Heston; The Fabricator; pp. 56-58; Jul. 2012.

* cited by examiner

GENERAL VENTILATION SYSTEM WITH AUTOMATIC CLEANING CYCLE

CROSS-REFERENCE TO RELATED APPLICATIONS

This divisional application claims the benefit of and priority to U.S. application Ser. No. 14/790,887, filed Nov. 6, 2015, which claims the benefit of and priority to United States application Ser. No. filed Nov. 4, 2014 the entire contents of which are hereby expressly incorporated by reference into the present application.

BACKGROUND OF THE INVENTION

1. Discussion of the Related Art

The present invention relates to the field of general ventilation with air filtration. More particularly, the present invention relates to ventilation and air filtration systems of commercial, industrial manufacturing facilities. Specifically, a preferred embodiment of the present invention relates to a method of maintaining and cleaning the air filters in a ventilation and air filtration system of a commercial, industrial manufacturing facility.

2. Discussion of the Related Art

Historically, it was known in the prior art that air quality of a manufacturing facility is important. Failure to provide a clean air environment within such a facility can lead to health problems and diminished worker productivity. A conventional way to address air quality is simply to operate a fan and open a window. This allows air circulation and a source of clean, fresh air.

Due to environmental concerns, venting polluted air to the outdoors is no longer acceptable. There are many regulations in place that limit the amount of air a commercial facility may exhaust to the environment. To address these restrictions, air filters have been used within facilities to remove harmful particulates from the indoor air and limit the amount of air necessary to be exhausted.

Large motors operating large blower fans are commonly used in manufacturing facilities. These motors can be as large as 20 kilowatts, "20 kw", and flow a significant amount of air, up to 10,000 cubic feet per minute, "cfm". While these are impressive numbers, such a large volume of air flow is not needed to effectively clean the ambient air within a facility. The motors are commonly oversized as a single motor is used for a large facility. Duct may be run throughout the building to collect air from many different locations to the large blower. An air filter, or a series of air filters, are commonly located proximate the large blower and filter out particulates from the air.

One problem associated with these air filtration units is that a large and powerful blower is necessary to properly remove airborne particulates throughout the building. The large and fast moving volume of air passing through the air filters deeply imbeds the particulates into the filter. As the filter fills up with particulates, the air flow is diminished and creates a higher filter pressure. For this reason, extra large motors are used to ensure a reasonable cycle time between air filter cleaning. Unfortunately, as the particulates get buried deep into the filter, cleaning the filter only partially removes particulates. The deeply imbedded particulates are very difficult, if not impossible, to be cleaned out of the filter. This requires frequent replacement of the air filters which can be quite costly over time.

As mentioned, known air filtration systems include very large blowers, often centrally located, with industrial duct ran throughout the facility. The single, large blower and dust collection device powerfully draws particulate laden air from throughout the facility into a filtration unit. The common rationale was that a single motor could be purchased large enough to clean an entire building for much less than the cost of multiple smaller units. While the initial cost savings may be realized, particulates are buried deep into the air filtration media as the powerful motor is set to either "ON" or "OFF". A very large volume of air flow is generated when the air filter is clean. As the air filter is loaded with particulates, a restriction is introduced into the air flow. The large motor continues to operate at the same setting but now has a restriction in the air flow path. The air flow therefore lessens until gradually the air filter is saturated and there is minimal air flow through the air filter.

When it came time to clean these known air filters, the particulates were buried deep within the media and are very difficult, if not impossible, to remove. The air filter cleaning operation may not show much captured particulates evacuated as much of the particulates remain hidden within the air filter.

Furthermore, the known cleaning operations may include percussion against the air filter to dislodge the imbedded particulates, but the particulates would not be released. The air filters are routinely discarded or soiled air filters are re-introduced into the filtration device. Once the large motor is re-started, the air filter is again slammed with a very high air flow. A cloud of particulates may also be present within the air filtration unit following the percussion used to clean the air filter. Once the large motor is re-started, the cloud of particulates within the filtration device is re-introduced into the air filter. This cycle may be repeated consuming a great deal of electrical energy operating the large motor and also at a great expense not only for the electrical energy but also in replacement air filters.

Additionally, the large motor may exhaust a great deal of ambient air within the facility. This presents a loss of energy used to heat, cool, and otherwise establish a consistent and comfortable environment within the facility. Costly "make-up air" units are often necessary that blow air into the facility in order to match air that is exhausted. These make-up air units are often required by building codes and also prevent a large vacuum from being created within the building. The make-up air also requires instant heating in cold climates which again presents added expenses for both the make-up air unit and in energy consumption.

Replacement air must also be made-up with what is commonly referred to as a make-up air unit. For each CFM that is exhausted by a ventilation unit, a CFM must be brought within the facility from the outdoors. Depending on the outdoor temperature, this outdoor air requires heating or cooling which can also be very costly to the facility owner.

What is needed therefore is a ventilation and air filtration system for a manufacturing facility that is capable of filtering the air without large, costly motors. What is also needed is a system that does not require very high CFMs in order to effectively filter the ambient air within the facility. Further, what is also needed is a ventilation and air filtration system that does not deeply imbed particulates into the air filters. Lastly, what is needed is an air filtration system that can equally filter the air as compared to, or improve the performance of, known ventilation and filtration systems while consuming less energy and exhausting less ambient air. Heretofore, these requirements have not been fully met without incurring various disadvantages.

SUMMARY OF THE INVENTION

The inventive ventilation and air filtration system contains a housing with an air inlet and an air outlet that air flows through. The air filter within the housing captures airborne particulates and receives an ambient air from the air inlet and expels air through the air outlet. A motor inside the housing causes an ambient air to flow through the housing and air filter. Preferably, a variable-speed drive inside the housing controls he speed and torque of the motor by maintaining a target motor input frequency and a voltage. An air pressure sensor monitors an air filter pressure at the air inlet and within the air filter. An air filtration control unit mounted within the housing may activate and deactivate the air filtration system based on a predetermined air filter pressure and control the motor RPM and drive frequency based on the air filter pressure. The air velocity, monitored by a sensor, communicates with the controller to modify the fan speed in an optimal way. Preferably, an automated air filter cleaning system contains a hose that dislodges the particulates within the air filter by blowing compressed air and utilizing a percussive force of the hose against the air filter within the housing.

The ventilation and air filtration system may have a common compressed air source, requiring active compressed air to meet or exceed the constant 35 psi requirement at the unit for the housing that automatically delivers 35 psi of compressed air when requested by the automated air filter cleaning system when the filter pressure differential reaches the prescribed set point. The supplied compressed air may be 40 psi or lower, but preferably is controlled at 35 psi. The air filtration system preferably uses a remote service system that communicates with and controls the air filtration control unit and the automated air filter cleaning system through the internet, telephone, or cellular networks. This system will also monitor their facility pressure via a sensor that will also alarm upon sensing an inadequate pressure of air from the common source.

The housing may be in fluid communication with another housing, which preferably also contains an automated air filter cleaning system. An access gate may be in fluid communication with one or more of these unit housings and may be selectively opened and closed by the air filter cleaning control unit. A master control unit preferably communicates with and remotely manages the air filtration control unit and the air filter cleaning system in each of the housings.

In one preferred embodiment, a graphical user interface in communication with the air filtration control unit indicates a status of the air filter. The indicated statuses include; the air filter is fully operational such that the predetermined air filter pressure is maintained while the motor is within the target motor input frequency and the voltage; the air filter is approaching a service requirement such that the motor input frequency and the voltage is approaching a high limit; and the air filter is saturated with the particulates and the motor input frequency and the voltage consumed to maintain the predetermined air filter pressure has reached the high limit.

The air filtration system may also contain a programmable logic controller, "PLC", integrated with the air filtration control unit and a power distribution panel for supplying power to the motor and variable-speed drive controlled by the programmable logic controller. A computer network links multiple housings with a motor and variable-speed drive and an air filtration control unit. Motorized louvers preferably direct a flow of air into the air inlet and air outlet of the first housing.

The air filtration system may contain a housing in fluid communication with another housing with an automated air filter cleaning system and an access gate in fluid communication with one of the housings that is selectively opened and closed by the air filter cleaning control unit. A manual activation lever or a micro switch attached to the access gate may initiate the automated air filter cleaning system and a vacuum source 88 attached to the manual activation lever may receive a vacuum source when removing the particulates from the filter. The graphical user interface, "GUI", in communication with the air filtration control unit preferably logs and displays performance data of the air filtration system graphically on a video screen.

An air filter cleaning process controlled and initiated by the air filtration control unit reverses a flow of air through the air filter releasing particulates from the air filter when the automated air filter cleaning system is activated. The air filter cleaning process may be activated only in the respective housing requiring an air filter cleaning process.

A method of operating an automated air filter cleaning system may monitor and control air flow through an air filter within a housing while maintaining the air flow above a predetermined low-point and below a predetermined high point. Power supplied to a motor may be modulated and control a blower generating the air flow to maintain the airflow through the system above the predetermined low-point. The air flow is also maintained below the predetermined high point, or at a predetermined set point. Airborne particulates are also filtered out from the air flow with the air filter. All the while the air flow is maintained above the predetermined low point and below the predetermined high point while the air filter is collecting the airborne particulates by modulating the power supplied to the motor, and stopping the motor when the power required to maintain the air flow reaches a threshold.

Re-starting the motor to maintain an air flow below the predetermined low-point settles airborne particulates within the housing. The air filter is then cleaned with a compressed air to dislodge the particulates in the air filter and reverse the air flow through the air filter. The particulates may then be removed from the housing with a vacuum suction device.

The air flow through the system is preferably monitored and controlled as it flows through other air filters within additional housings. Power supplied to each motor powering each blower is modulated such that it maintains the airflow above the predetermined low-point and below the predetermined high point. Airborne particulates from the air flow with the air filter in each of the housings may be filtered. The motor in an individual housing may be stopped when the power required to maintain the air flow reaches a threshold. The particulates are then removed from the housing with a vacuum suction device during a cleaning cycle.

Each one of the housings may be networked together with a computer network, monitored and controlled with a programmable logic controller, and electronically communicated with the computer network via the Internet.

During the cleaning cycle, an access gate to the housing may be manually opened, or alternatively automatically opened, and the motor re-started, producing a revered air flow in the housing at a level below the predetermined low point. A vacuum source may then be attached to the housing to vacuum the particulates out of the housing.

During operation of the system additional power may be delivered to the motor as the air flow lessens due to the particulates in the air filter. This ensures that the air flow is maintained above the predetermined low point. Less power may be delivered to the motor as the air flow increases due to a lack of particulates in the air filter which also ensures the air flow is maintained below the predetermined high point. A single central vacuum source may be connected to the housings, initiating the air filter cleaning system to remove the particulates from the air filter with the vacuum source by applying a vacuum to one housing while continuing to maintain the air flow through the other housings.

These and other features and aspects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the words "connected", "attached", or terms similar thereto are often used. They are not limited to direct connection but include connection through other elements where such connection is recognized as being equivalent by those skilled in the art.

DESCRIPTION OF PREFERRED EMBODIMENTS

The present invention and the various features and advantageous details thereof are explained more fully with reference to the non-limiting embodiments described in detail in the following description.

1. System Overview

A. Single Housing Unit

On startup, the PLC automatically issues a run command to the drive. The drive accelerates the motor until the airflow feedback satisfies the run set point and maintains this value via PLC control. The PLC monitors a differential transducer to determine the load on the filter and will trigger a self-cleaning sequence if the pressure rises above the threshold.

When a clean is triggered the PLC stops the drive, opens the gate, and closes the louvers. After a forty-five second delay to let the louvers close, the PLC opens the solenoid for four seconds, rests for ten seconds, and repeats the process for a total of four cleaning cycles. After the fourth clean, the unit stops the fan, closes the gate, and opens the louvers. It will wait for forty-five seconds and then run the drive back up to the run set point.

This unit includes a web page with a GUI for basic controls and settings. The user can turn the fan on and off and issue a manual clean request. The user can monitor fan state, drive output and most input/output.

A thermal sensor, a drive fault indicator and a resetting button may also be included. An indicator light on the web page preferably shows if the drive is faulted or if the thermal sensor is open. The reset button may also be used for soft faults. If the reset button does not reset the drive, the unit may need advanced troubleshooting.

Air filter feedback may be calculated by determining value average calculations. This includes a moving average of the filter feedback to eliminate spikes before processing the value. This update also includes a twenty second threshold timer before a unit can request a cleaning cycle.

The cleaning cycle set point may be determined by checking the air filter air flow level after a cleaning cycle. If the level is too close to the clean set point after three consecutive cleans, the set point increases.

Vacuum input may also be automatically detected. This allows the unit to accept an external signal from a vacuum unit as a cleaning cycle trigger. Once a signal is sent, it will need to be cleared before it can retrigger a cleaning cycle. An indicator light may be shown or transmitted onto a web page as well.

The cleaning cycle set point may also be manually adjusted by entering a target feedback value for the run fan set point, such as 0-100%.

An alternate fan set point during the cleaning allows the operator to set a second target feedback value for the fan while the unit is in the clean cycle, such as 0-30% which is used to eliminate any cloud of particulates during the cleaning cycle. Any one of the set points may be manually adjusted from the web page. For example, they may be set to 0.00% to disable.

A toggle button feedback may include web page toggle buttons which change color to indicate the various statuses of the system. A gate status indicator light may also be added to the web page to show the gate status. Also, a cleaning cycle sequence indicator can be used to show the state of the solenoids of the access gates, i.e., open or closed.

B. Multiple Housing Unit

On startup, the PLC automatically issues a run command to the first drive, waits twenty seconds, and starts the second drive. Each drive accelerates their motor until the airflow feedback satisfies the run set point and maintains this value via PLC control. The PLC monitors a differential transducer to determine the load on the filter and will trigger a self-cleaning sequence if the pressure rises above the threshold.

When a clean is triggered, the PLC stops the side with the clean request and slows the other side to its clean speed. Once the main drive stops, the PLC opens the correct gate and closes the louvers. After a forty five second delay to let the louvers close, the PLC opens the respective solenoid for four seconds, rests for ten seconds, and repeats the process for a total of four cleaning cycles. After the fourth clean, the unit stops the main fan and returns the second fan to its run speed while it closes the gate and opens the louvers. It will wait for forty five seconds and then run the main drive back up to the run set point.

This unit includes a web page for basic controls and settings. The user can turn the fan on and off and issue a manual clean request. The user can monitor fan state, drive output and most functions of the system.

A thermal sensor, a drive fault indicator, and a resetting button may also be included. An indicator light on the web page preferably is used to show if the drive is faulted or if the thermal sensor is open. A reset button can be used for soft faults. If the button does not reset the drive, the unit may need advanced troubleshooting.

Air filter feedback may be calculated by determining value average calculations. This includes a moving average of the filter feedback to eliminate spikes before processing the value. This update also includes a twenty second threshold timer before a unit can request a cleaning cycle.

A self-adjusting cleaning cycle set point preferably checks the air filter level after a cleaning cycle. If the level is too close to the clean set point after three consecutive cleaning cycles, the set point increases.

Vacuum input may be detected which allows the unit to accept an external signal from a vacuum unit as a cleaning cycle trigger. Once a signal is sent, it will need to be cleared before it can retrigger a clean. This preferably includes a web page indicator light.

A manual run set point adjustment can be used to enter a target feedback value for the run fan set point, 0-100%.

Any one of the set points may be manually adjusted from the web page. For example, they may be set to 0.00% to disable.

A toggle button feedback may include web page toggle buttons which change color to indicate the various statuses of the system. A gate status indicator light may also be added to the web page to show the gate status. Also, a cleaning cycle sequence indicator can be used to show the state of the solenoids of the access gates, i.e., open or closed.

A second motor set point during cleaning can be used to allow the operator to set a second target feedback value for the motor while the unit is in the cleaning cycle, such as 0-30%. This may also be done manually from the web page, i.e., set to 0.00% to disable.

An individual drive control can also be used after the initial startup period. The motors can be turned off and on independently through the web page.

The air filter pressure differential cleaning set point is increased automatically based on an algorithm that monitors the cleaning efficiency and ongoing loading of the filter media. For example, an original cleaning filter differential set point of 3 inches of water column, also referred to as "in wc", after time the filter differential drops to only 2.9 in wc, thereby automatically increasing the filter cleaning trigger to 3.5 in wc from the original 3.0 in wc and so on until 5.0 in wc is reached and a filter change is required.

C. Optional Features for Both Single Housing and Multiple Housing Units

Manual cleaning cycle set point adjustment can be done by entering a value for the automatic cleaning set point.

A Blinking light gate indicator preferably blinks when the gate is opening or closing.

A cleaning cycle, or "Housekeeping detection system" can be field-controlled or field-enabled for housekeeping detection and operation.

The automatic cleaning cycle system can be removed so that the cleaning cycle is only initiated if a vacuum is attached.

Variables may be gathered and stored in a remote location. Variables may include:
Running cost-kW
kWh-Filter Health, filter pressure
drive hours-drive speeds
date/time Additional digital outputs and controls can be used to increase the number of lights, gates and vacuum input options.

Additional controls for up to four housings in a single unit may be included.

The motor stop step prior to the cleaning cycle can be eliminated and replaced with a "fan drop to clean speed" step.

Remote accessibility can be added to any of the field units.

Louvers may be opened on startup and closed on shutdown.

The louvers may default to a closed position and will only open on command.

The louvers may also be available as a separate kit option with an auto detect feature.

A vacuum unit may be available as a separate kit or option with an auto detect feature.

2. Detailed Description

Figure 1:
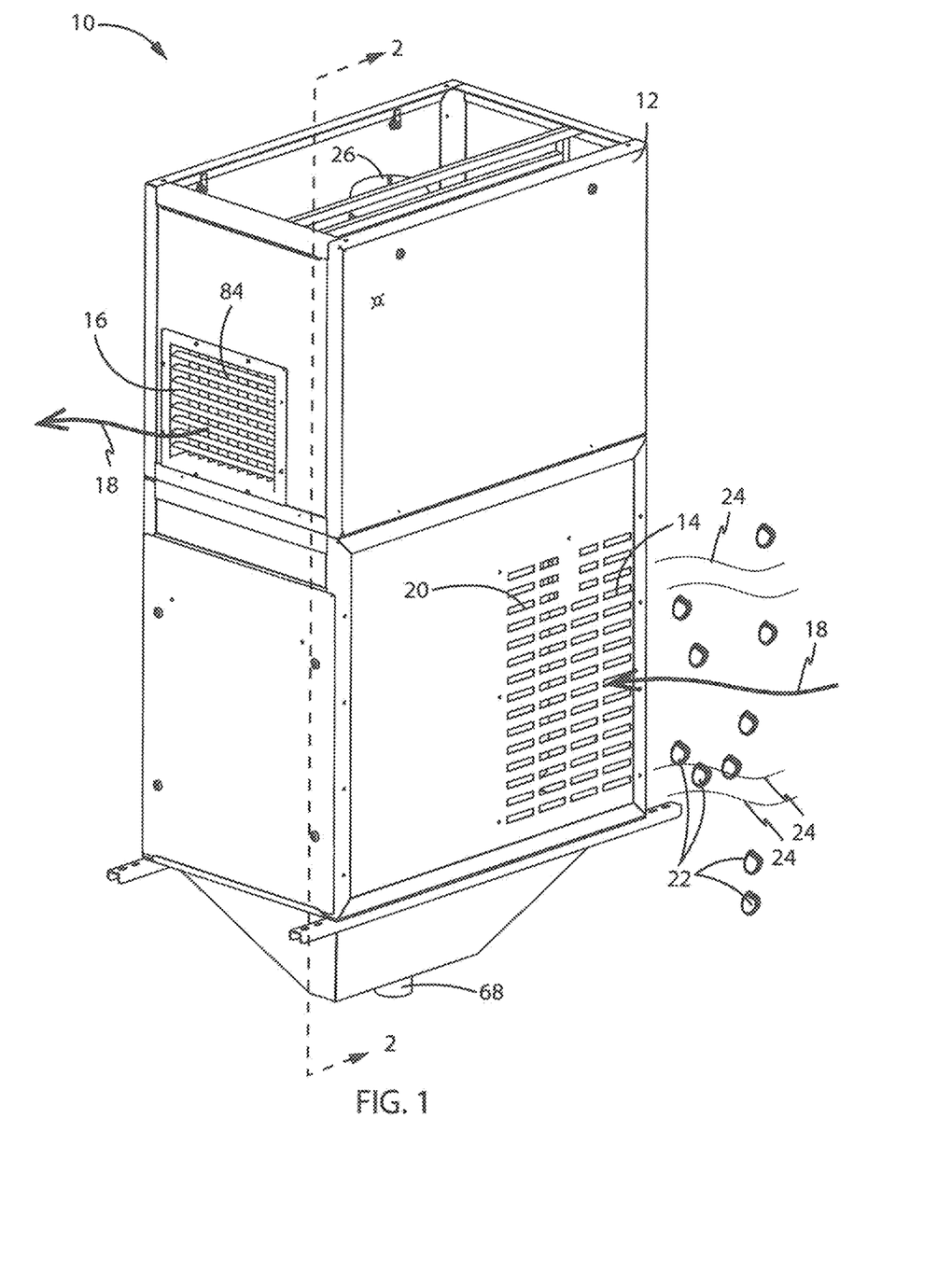
FIG. 1 illustrates perspective view of an air filtration system including a single housing.

Beginning with FIG. 1, a preferred ventilation and air filtration system 10 is shown. The system 10 operates to filter out airborne particulates 22 from the surrounding ambient air 24. These particulates 22 may be generated from a number of manufacturing processes. For example, one manufacturing process known to generate a significant amount of particulates 22 is welding.

When welding in a manufacturing environment, it is necessary to either exhaust the fumes and particulates 22 generated or to filter them from the ambient air 24. When exhausting the particulates to the outdoors, there are many laws and regulations that are of concern. The particulates 22 are considered pollution and are therefore regulated by a number of governmental agencies such as the Environmental Protection Agency, "EPA" or the Occupational Health and Safety Association, "OHSA". Additionally, exhausting the particulates 22 and ambient air 24 to the outdoors wastes energy from heating and cooling the interior of the manufacturing facility.

As a result, the ventilation and air filtration system 10 is equipped with an air filter 20 that actively filters out the particulates 22 from the ambient air. The air filter 20 is contained within a first housing 12. The housing 12 is equipped with a motor 26 to generate an air flow 18 through the air filter 20. The ambient air 24 containing the airborne particulates 22 flows through the air inlet 14 of the housing 12 and into the air filter 20.

Figure 2:
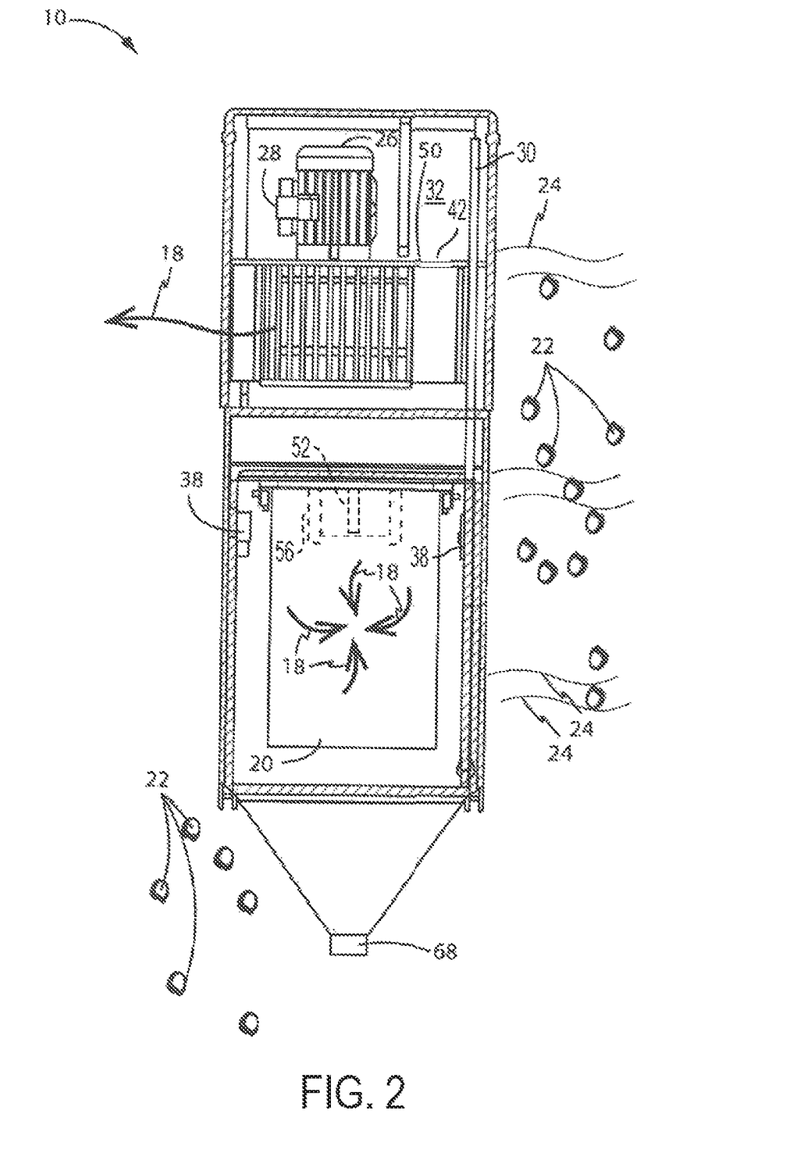
FIG. 2 illustrates a side view (scaled down for illustrative purposes) of the air filtration system according to FIG. 1, with a side panel removed showing the internal contents of the housing.

Looking at FIG. 2, the air flow 18 is shown entering the air filter 20 as a side panel of the housing 12 is removed. The particulates 22 are captured on the exterior of the air filter 20 and the air flow passes through to the center of the air filter 20 and rises up through the housing 12. The air flow 18 then passes through the air outlet 16 without the particulates 22. The particulates 22 are contained within a lower part of the housing 12 and adhere to the air filter 20 as the continuous air flow 18 ensures they are sufficiently trapped. Manually adjustable louvers 84 may also be included on the air outlet 16 and used to direct the air flow 18 as it exits the air outlet 16.

Figure 3:
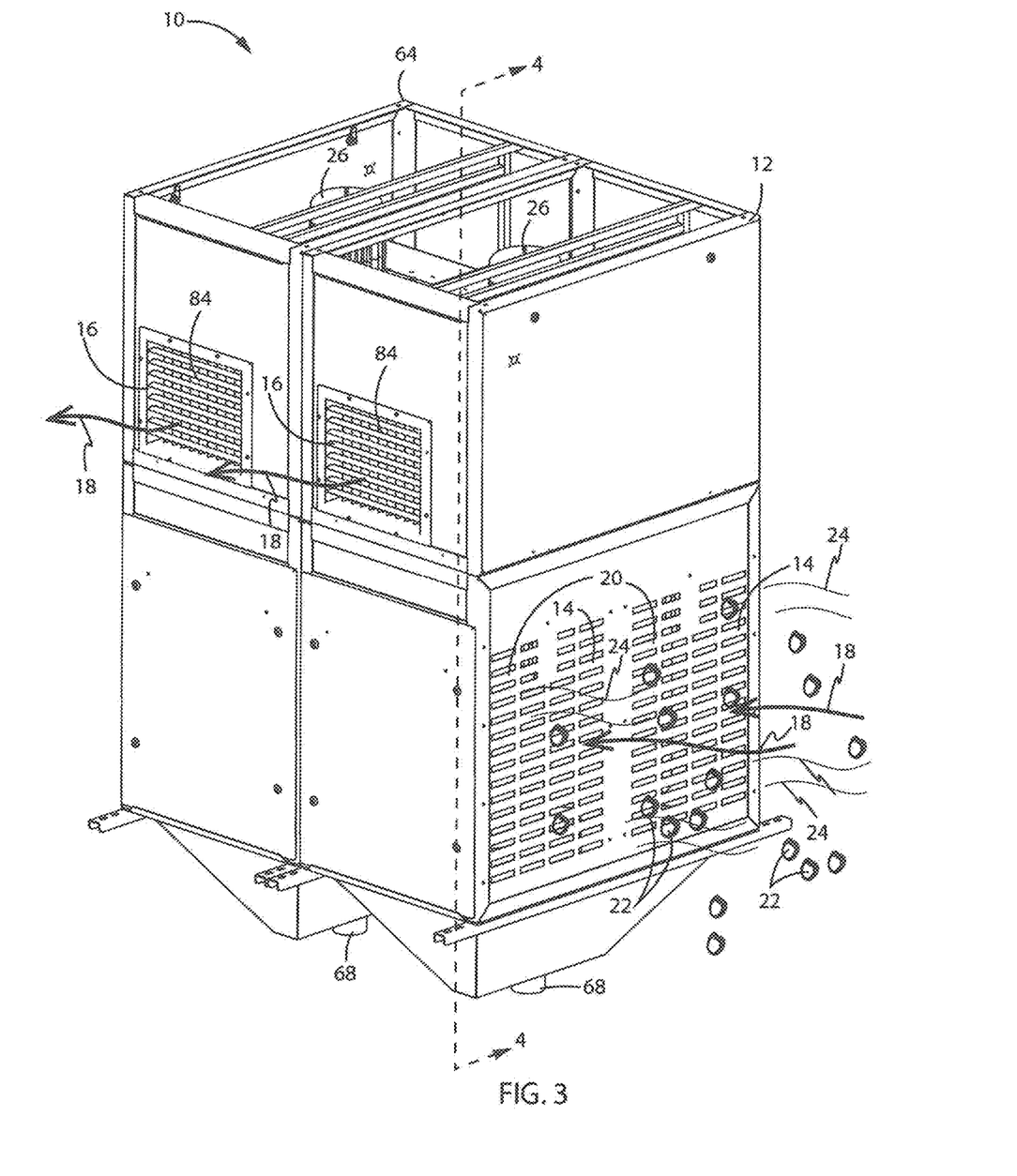
FIG. 3 illustrates a perspective view of an alternate embodiment of the invention with multiple housings attached forming an air filtration system with a higher capacity than the air filtration system according to FIG. 1.
Figure 4:
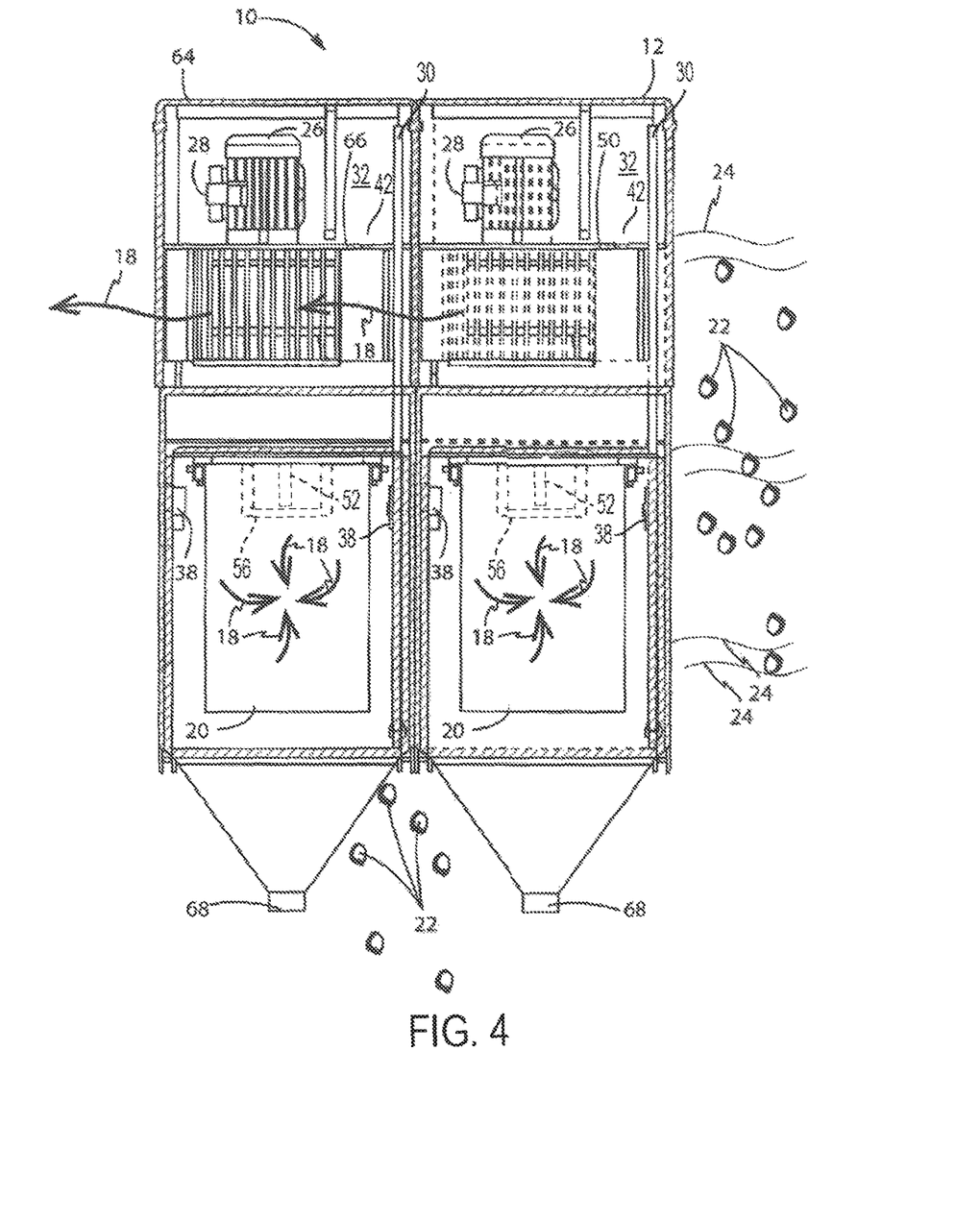
FIG. 4 illustrates a side view (scaled down for illustrative purposes) of the air filtration system according to FIG. 3, with side panels removed showing the internal contents of the housings.

Another embodiment of the invention is shown in FIGS. 3 and 4. FIGS. 3 and 4 show a first housing 12, like is shown in FIGS. 1 and 2, but include an additional second housing 64. Each one of the housings 12 and 64 include a motor 26 and air filter 20 for filtering airborne particulates 22 from the ambient air 24. The larger ventilation and air filtration system 10 shown in FIGS. 3 and 4 provide an added benefit of increased air filtration capacity.

At the heart of the inventive ventilation and air filtration system 10, is an air filter control unit 42. The air filter control unit 42 controls the operation of the system. A single air filter control unit 42 may be included in each one of the housings 12 and 64 for a multi-unit assembly as shown in FIGS. 3 and 4.

In another embodiment, the air filter control unit 42 may be programmed or modified such that a single air filter control unit 42 powers any number of connected housings. Such a design can present significant cost savings as the air filter control unit 42 utilizes a programmable logic controller, or PLC.

The air filter control unit 42 preferably intelligently controls the operation of the ventilation and air filtration system 10. The air filter control unit 42, unlike prior air filtration systems, monitors the air flow 18 through the housings 12, 64 and modulates the power consumed by the motor 26 such that the air flow 18 is always maintained within a predetermined set point. This predetermined set point may be a specific air pressure determined by a differential air pressure sensor 30 sensing the air pressure external to the air filter 20 and comparing it to within the air filter 20. The set point may also be calculated as a function of total air volume such as cubic feet per minute, "CFM", flowing out of the air outlet 16.

Preferably, the air flow 18 through the air filter 20 is maintained above a predetermined low point and below a predetermined high point. In other words, a window is determined based on factors such as the size of the facility, the size of the air filter, the amount of air filters used, the type of filtration media, and the amount of particulates 22 in the air. The air flow 18 may be maintained within this set point a number of ways. For example, in order to conserve energy, the power consumed by the motors 26 is regulated such that the air flow 18 set point is consistently maintained despite the condition of the air filters 20.

Referring to FIGS. 1-4, the air filtration control unit 42 actively regulates the power of the motor 26 with the use of a variable frequency drive 28. The air filter control unit 42 ensures that the motor 26 is regulated such that the target set point of airflow 18 is consistently maintained both with a new air filter 20 as well as with a heavily soiled air filter 20. By only flowing the amount of air necessary to clean the ambient air 24, the particulates 22 do not imbed deep into the air filter 20. The particulates 22 remain superficially on the surface of the air filter 20 and are much easier to remove. As a result, air filter 20 service life is significantly increased. Power consumption is also significantly lower as it is less costly to operate multiple small motors 26 than a single large motor. The smaller size of the motor and any associate blower has less inertia to spool up which requires less energy.

The air filtration control unit 42 does not necessarily require a variable frequency drive 28. Any known device capable of regulating the power consumption of the motor 26 may be used. As the goal is to reduce power consumption, it is preferred that whatever device or method used to regulate the air flow 18 through the air filter 20 also conserve the amount of electricity consumed. For example, a simple heat resistor would be undesirable as it would limit the current delivered to the motor but would still consume the current and convert it to heat. A variable frequency drive 28 avoids consumption of the electrical energy when it is not required.

As the air filtration control unit 42 monitors the air flow 18 and maintains it at a set point by adjusting the frequency of the motor 26, the amount of energy consumed is also monitored. A high limit may be predetermined in which once the amount of energy required to maintain the airflow 18 reaches the high limit, an automatic cleaning cycle may be initiated. The automated cleaning cycle may be controlled by an automated air filter cleaning system 50 as shown in FIGS. 1-4. A second automated air filter cleaning system 66 may be installed in a second housing 64, or the first housing 12 may include a sole automated air filter cleaning system 50 that controls the cleaning cycle of each attached housing.

Figures 5, 5A, 5B:
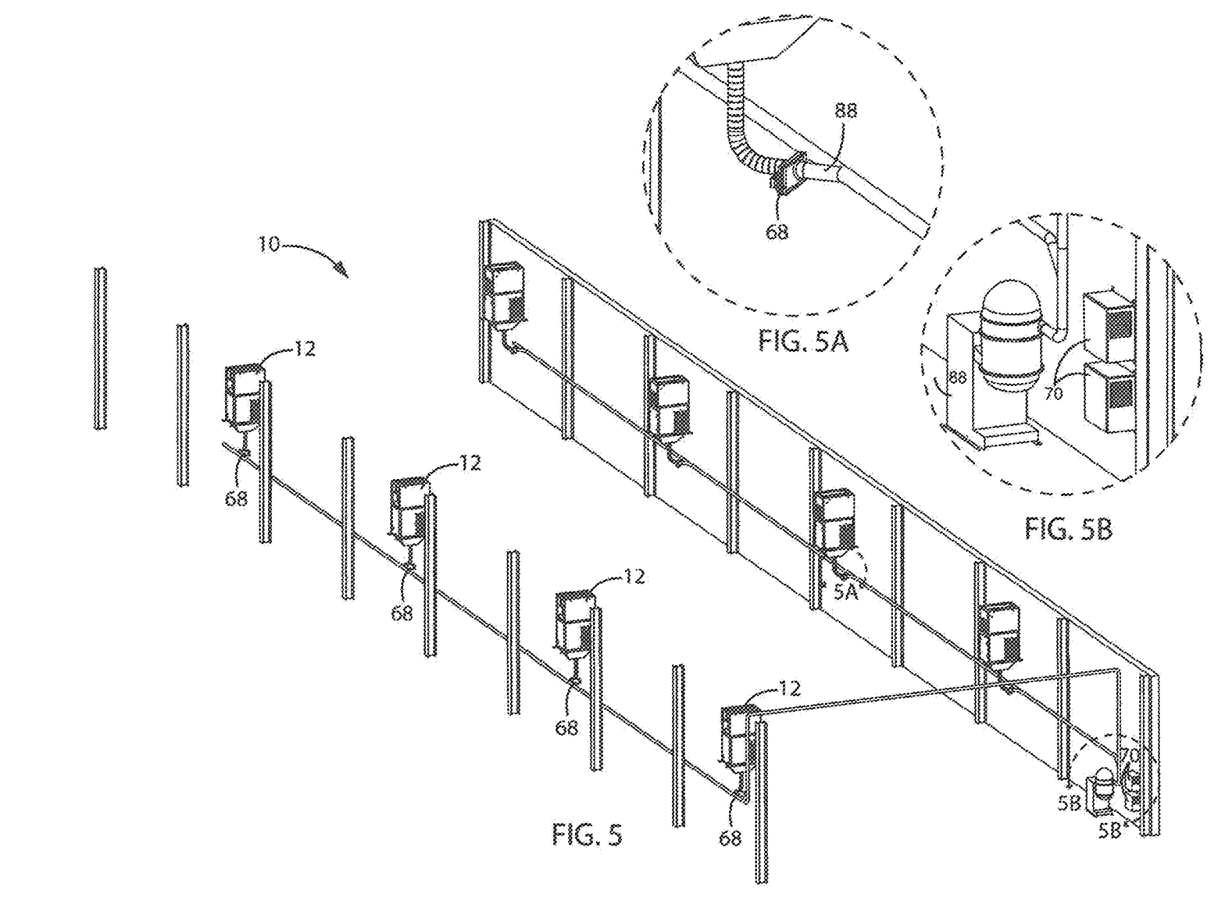
FIG. 5 illustrates a perspective view of a typical implementation of the invention according to FIG. 1 with multiple housings throughout a facility and a common central vacuum source servicing each one of the housings (note the view is significantly scaled for illustrative purposes)
FIG. 5A illustrates a close-up image of a vacuum source and access gate as shown in FIG. 5.
FIG. 5B illustrates a close-up image of a vacuum source and master control unit as shown in FIG. 5.

Referring to FIG. 5, once the automated air filter cleaning system 50 is activated by the motor 26 consuming an amount of energy above the high limit to require the air flow 18 at the set point, the motor 26 is shut off automatically. Only the respective housing 12 in the facility that has surpassed the high limit requires automatic shut off. The remaining housings 12 may continue to operate. This ensures locations in the facility that do not require shut off remain operational. Known systems commonly shut off the entire facility for the cleaning operation, which is undesirable.

The automated air filter cleaning cycle may commonly be referred to as a HOUSEKEEPING™ process. In this cleaning cycle, the motor 26 in the respective housing is shut off, thus ceasing the air flow 18. An access gate 68 may then automatically open which, through a vacuum source 88, allows particulates to be evacuated from the housing 12 to a vacuum source 88. The vacuum source 88 may be any known central vacuum that is connected to any number of housings. The automated air filter cleaning system 50 may then re-start the motor 26 to run at a very low rate, below the predetermined low point. The motor 26 may be run simply to prevent particulates 22 within the respective housing 12 from forming a cloud. The motor 26 may also be run in reverse to assist in "pushing" the particulates 22 out of the air filter 20. The motorized louvers 84 on the housings 12 may also be shut to prevent the particulates 22 from escaping the respective housing.

As shown in FIG. 2, preferably a plurality of hoses 52 may be powered with a compressed air from a common compressed air source. The common air source may be plumbed to each one of the housings 12 and be configured to deliver compressed air to the hoses 52 when the automated air filter cleaning system 50 activates the cleaning cycle. The compressed air may also be regulated to 90 psi or below, OF even below 50 psi. While it is known to use compressed air to clean air filters, it is commonly done at very high air pressures. The expenditure of high air pressure consumes a great deal of energy and also causes damage to the filter media of any air filters. As a result, the ventilation and air filtration system 10 uses minimal air pressure which is regulated by a pressure regulator which may be attached to the housing 12. The automated air filter cleaning system 50 activates the air pressure and causes the hoses 52 to move about and present a percussive force against a mesh screen 56 in the interior of the air filter 20. This percussive force is generated as the hose is flexible and wiggles around randomly from the air pressure. The percussive force helps dislodge the particulates 22 from the air filter 20. As the motor 26 was controlled to maintain a target air flow 18, the particulates 22 are not imbedded deep into the air filter 20.

Referring to FIGS. 5, 5A, and 5B, the particulates 22 fall to the bottom of the housing where an access gate 68 allows the particulates 22 to pass into a vacuum source 88. The access gate 68 may be controlled by the automated air filter cleaning system 50 to open at the appropriate time and also close following the cleaning cycle. The vacuum source 88 may also be activated by the automated air filter cleaning system 50 and pull out the particulates 22 with a vacuum suction thus effectively evacuating the particulates 22 from within the housing 12 and the air filter 20. Following evacuation, the automated air filter cleaning system 50 may close the access gate 68, stop the compressed air from being delivered to the hoses 52, stop the motor 26, open the motorized louvers 84, and re-start the motor 26 for normal operation. The motor may now be controlled once again to maintain the set point air flow 18.

A master control unit 70 may also be attached to each one of the housings 12 and monitor/control the function of each housing 12. The master control unit may communicate with the air filter control unit 42 and record performance data, power usage, cleaning cycles, and the like. Alternatively, the master control unit 70 may be networked with the housings 12 and communicate through the Internet, wirelessly, or through any known remote network.

Figures 6, 6A:
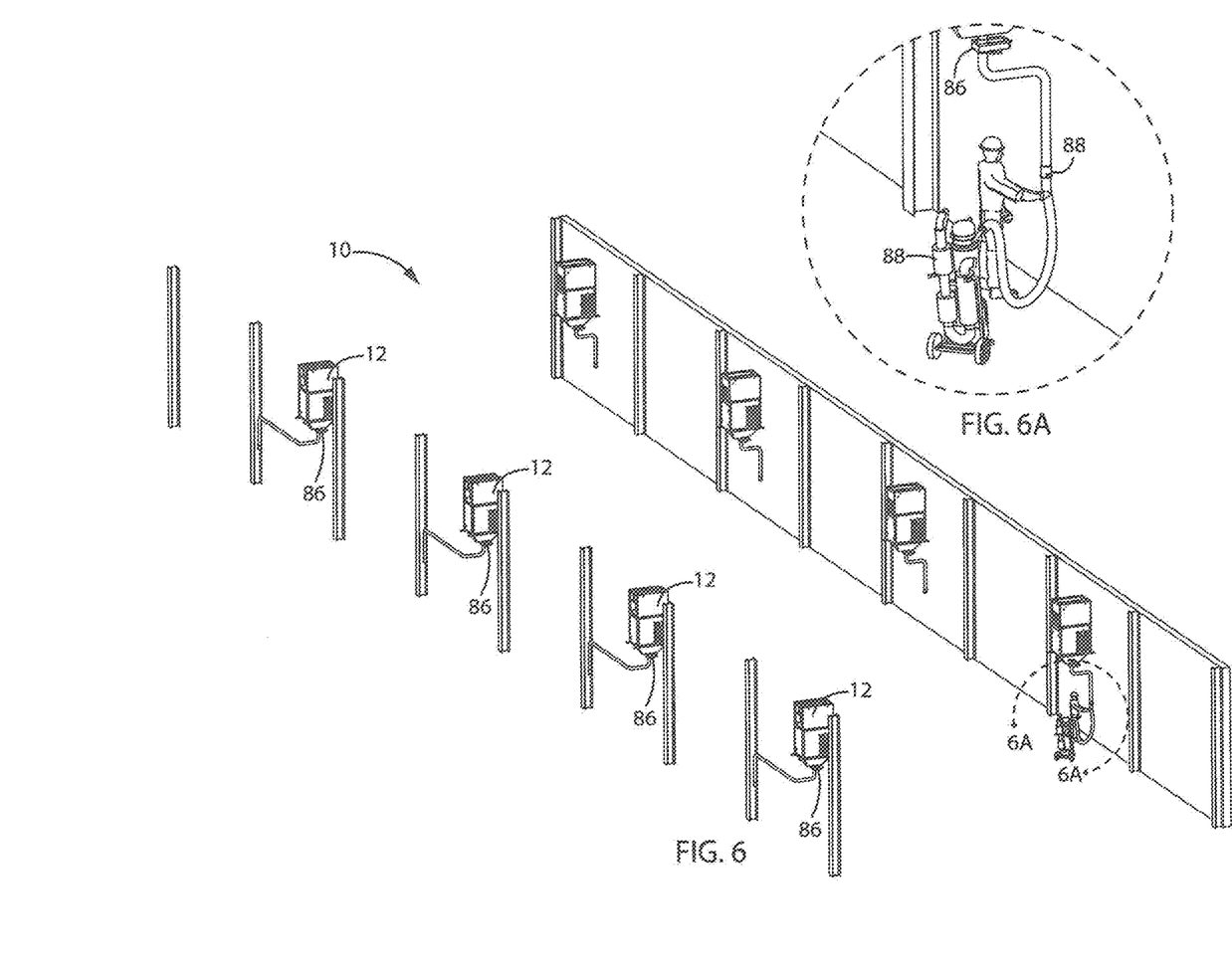
FIG. 6 illustrates a perspective view of an alternative implementation of the invention according to FIG. 1 with multiple housings throughout a facility and a common, portable vacuum source servicing each one of the housings (note the view is significantly scaled for illustrative purposes)
FIG. 6A illustrates a close-up image of a maintenance worker servicing the vacuum source and removing particulates from the air filter during a cleaning cycle, as shown in FIG. 6.

Referring now to FIGS. 6, 6A, and 6B, a similar embodiment of the invention as shown in FIG. 5 is shown. In this embodiment, each housing 12 is not networked to other housings. This application is intended for smaller facilities or for retrofit applications where facilities are currently equipped with known air filtration systems. Rather than remove the existing, known filtration systems, the air filtration control unit 42 may be retrofitted to existing housings as an add-on. Any number of components from the ventilation and air filtration system 10 may be added as a retrofit to existing systems to control the operation such that the motors are maintained at a target air flow. Maintaining the motor at a target set point for the air flow substantially distinguishes the ventilation and air filtration system 10 from known filtration systems.

A portable vacuum source 88 may be used that is portable in situations where a central vacuum source 88 is not desired. In such installations, the cleaning cycle may be manually triggered by manually tripping a manual activation lever 86. Once the manual activation lever 86 is engaged, the motor 26 may be powered off and the cleaning cycle initiated, similar to as is described with respect to FIG. 5. The particulates 22 may be manually evacuated with the vacuum source manually attached to the vacuum source 88. Following completion, the manual activation lever 86 may be closed, thus re-starting the motor 26 in normal operation. It is noted that in all embodiments, when the motor is operating at low speed to prevent clouds of particulates within the housing 12 during the cleaning cycle, there is substantially less power delivered to the motor.

Figure 7:
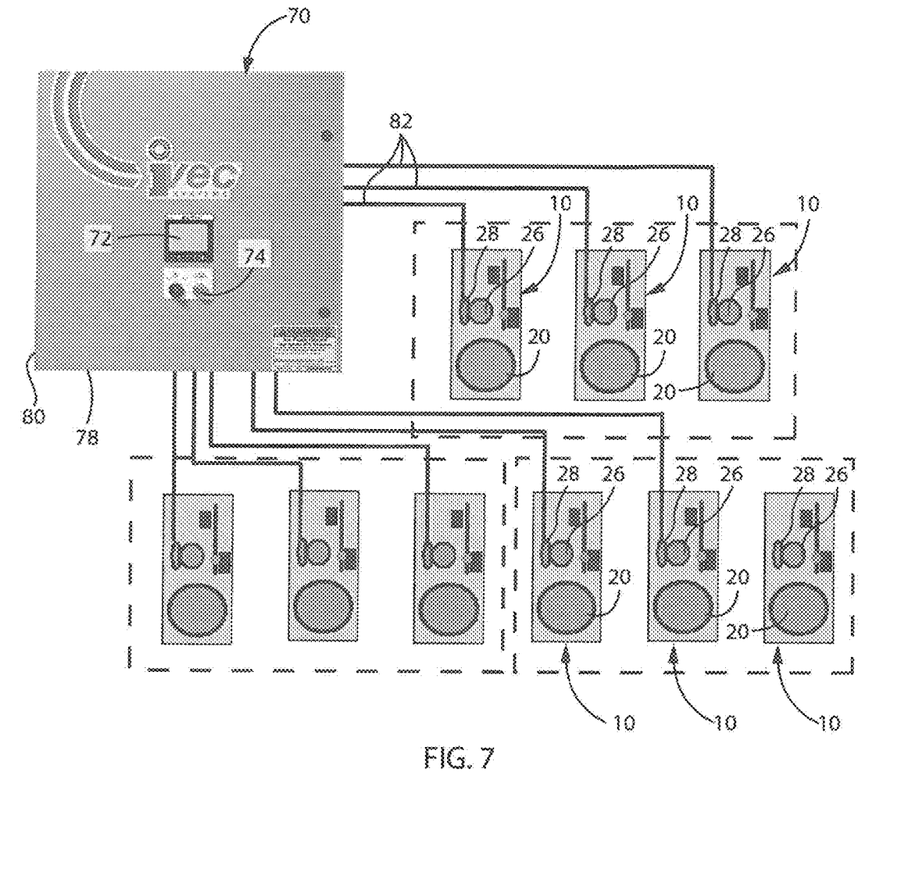
FIG. 7 illustrates a schematic view of an air filtration control unit that controls the air filtration system in either one of the embodiments shown in FIGS. 1 and 2.

FIG. 7 shows one conceptual example of how any number of air filtration systems 10 may be linked together over a network 82 with a master control unit 70. A graphical user interface 72 may be included with, or in communication with, the master control unit 70 and show performance data of each respective ventilation and air filtration system 10. The network 82 shown in FIG. 7 may also show a number of housings 12 each in communication with an automated air filter cleaning system 50 over a network 82. In such a configuration, a plurality of statuses 74 may be indicated on the graphical user interface for each one of the housings. Different lights or graphics may be used which show when a respective housing is approaching a saturated air filter 20, when the respective housing 12 requires a cleaning cycle, and then the respective housing 12 is fully operational with a clean air filter 20. As discussed, the variable frequency drive 28 for each motor 26 may be remotely controlled by either a master control unit 70 or controlled by a programmable logic controller 78 external to or within the automated air filter cleaning system 50.

Figure 8:
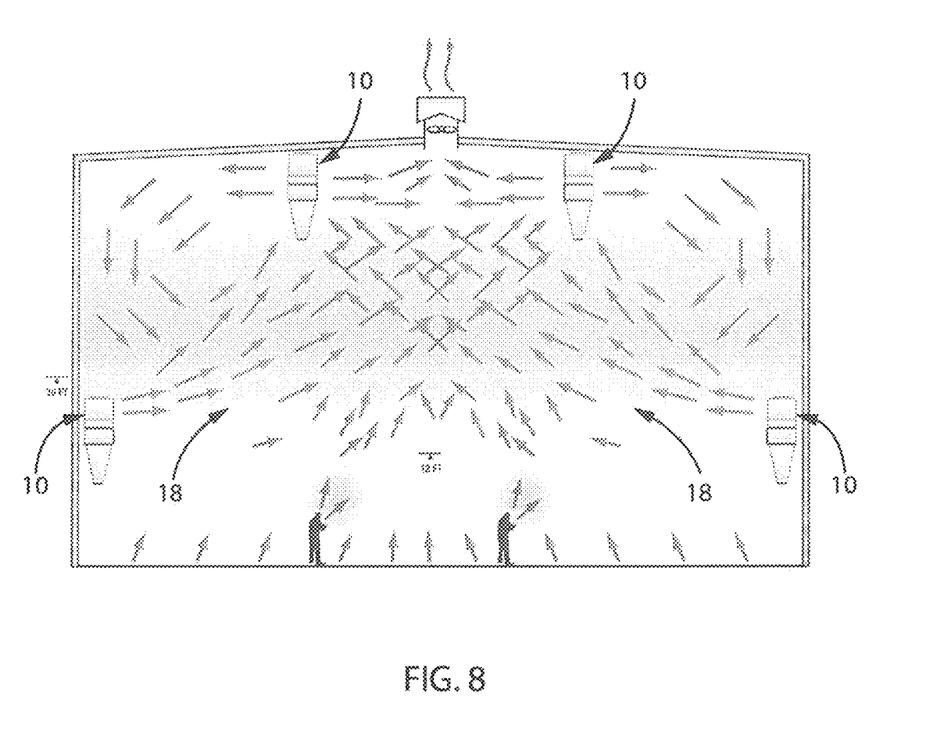
FIG. 8 illustrates a typical air flow within a facility equipped with the air filtration system as shown in either FIG. 1 or 2.

As previously mentioned, a plurality of housings 12, each one denoted as a ventilation and air filtration system 10, may be located throughout a facility as shown in FIG. 8. Each ventilation and air filtration system 10 may be equipped with motorized 38 louvers 84 that are either manually controlled or controlled by the master control unit 70 and/or the air filter control unit 42. The louvers 84 may direct clean air flow 18 upward and away from work zones. Directing clean air flow 18 in such a manner pulls the particulates 22 upward and away from the work sites. Keeping the particulates 22 above the work sites also prevents inhalation by employees. The location of the air filtration systems 10, as seen in FIG. 8, on both the roof and walls of the facility, maintain the air flow 18 above breathing areas. Also, by mounting the air filtration systems 10 on the walls and ceiling, the footprint of the entire air cleaning system is essentially zero.

Additional air filtration systems 10 located on a ceiling of a facility can further draw particulates 22 upward for proper filtration and direct clean air flow 18 downward. A roof vent may also be used to exhaust air and controlled by the master control unit 70 and/or the air filtration control unit 42. With multiple air filtration systems 10 strategically placed and strategically directing clean air flow 18, air currents may be formed within the facility that further assist in directing particulates 22 to optimal areas such as directly to air filters 20.

Although the best mode contemplated by the inventors of carrying out the present invention is disclosed above, practice of the present invention is not limited thereto. It will be manifest that various additions, modifications, and rearrangements of the features of the present invention may be made without deviating from the spirit and scope of the underlying inventive concept.

Moreover, the individual components need not be formed in the disclosed shapes, or assembled in the disclosed configuration, but could be provided in virtually any shape and assembled in virtually any configuration. Further, although the air filtration control unit 42, air filter cleaning control unit 32, and master control unit 70 described herein are physically separate modules, it will be manifest that they may be integrated into a single controller. Furthermore, all the disclosed features of each disclosed embodiment can be combined with, or substituted for, the disclosed features of every other disclosed embodiment except where such features are mutually exclusive.

It is intended that the appended claims cover all such additions, modifications, and rearrangements. Expedient embodiments of the present invention are differentiated by the appended claims.

What is claimed is:

1. A method of operating an automated air filter cleaning system comprising:
    monitoring and controlling an air flow through an air filter within a housing;
    maintaining the air flow above a predetermined low-point and below a predetermined high point;
    modulating a power supplied to a motor powering a blower generating the air flow to maintain the airflow above the predetermined low-point and below the predetermined high point;
    filtering airborne particulates from the air flow with the air filter;
    continuing to maintain the air flow above the predetermined low-point and below the predetermined high point while the air filter is collecting the air-borne particulates by modulating the power supplied to the motor;
    stopping the motor when the power required to maintain the air flow reaches a threshold;
    re-starting the motor to maintain a flow of air below the predetermined low-point such that airborne particulates within in the housing settle;
    cleaning the air filter with a compressed air within a center of the air filter to dislodge the particulates in the air filter and reverse the air flow through the air filter; and
    removing the particulates from the housing with a vacuum suction device.

2. The method of operating an automated air filter cleaning system according to claim 1, further comprising:
    monitoring and controlling an air flow through an air filter within a plurality of additional housings;
    modulating a power supplied to a motor powering a blower generating the air flow in each one of the respective housings to maintain the airflow above the predetermined low-point and below the predetermined high point;
    filtering airborne particulates from the air flow with the air filter in each one of the respective housings;
    stopping the motor in only the respective housing when the power required to maintain the air flow in the respective housing reaches a threshold; and
    removing the particulates from the respective housing with a vacuum suction device.

3. The method of operating an automated air filter cleaning system according to claim 2, further comprising:
    networking each one of the housings together with a computer network;
    monitoring and controlling each one of the housings with a programmable logic controller; and
    electronically communicating with the computer network via the Internet.

4. A method of operating an automated air system comprising:
    monitoring and controlling an air flow through an air filter within each one of a plurality of housings;
    maintaining an air flow through each one of the housings above a predetermined low-point and below a predetermined high point;
    modulating a power supplied to a motor powering a blower within each one of the plurality of housings and controlling the air flow such that it is maintained above the predetermined low-point and below the predetermined high point;
    filtering airborne particulates from the air flow with the air filter in each one of the plurality of housings;
    continuing to maintain the air flow in each one of the respective housings above the predetermined low-point and below the predetermined high point while the air filter is collecting the air-borne particulates in each one of the plurality of housings;
    stopping the motor in a respective housing when the power required to maintain the air flow in the respective housing reaches a threshold;
    initiating an air filter cleaning system to remove the particulates from the respective air filter while continuing to maintain the air flow through each one of the other housings;
    manually opening an access gate to the housing;
    re-starting the motor and producing a reversed air flow in the respective housing at a level below the predetermined low point; and
    attaching a vacuum to the housing and vacuuming the particulates out of the housing.

5. The method of operating an automated air filter cleaning system according to claim 4, further comprising:
    delivering more power to the motor as the air flow lessens due to the particulates in the air filter such that the air flow is maintained above the predetermined low point; and
    delivering less power to the motor as the air flow increases due to a lack of particulates in the air filter such the air flow is maintained below the predetermined high point.

6. The method of operating an automated air filter cleaning system according to claim 4, further comprising:
    connecting a single, central vacuum source to the plurality of housings; and
    initiating the air filter cleaning system to remove the particulates from the respective air filter with the vacuum source applying a vacuum only to the respective housing while continuing to maintain the air flow through each one of the other housings.

7. A method of operating an automated air system comprising:
    monitoring and controlling an air flow through an air filter within each one of a plurality of housings;
    maintaining an air flow through each one of the housings above a predetermined low-point and below a predetermined high point;
    modulating a power supplied to a motor powering a blower within each one of the plurality of housings and controlling the air flow such that it is maintained above the predetermined low-point and below the predetermined high point;
    filtering airborne particulates from the air flow with the air filter in each one of the plurality of housings;
    continuing to maintain the air flow in each one of the respective housings above the predetermined low-point and below the predetermined high point while the air filter is collecting the air-borne particulates in each one of the plurality of housings;

stopping the motor in a respective housing when the power required to maintain the air flow in the respective housing reaches a threshold;
initiating an air filter cleaning system to remove the particulates from the respective air filter while continuing to maintain the air flow through each one of the other housings;
opening an access gate to the housing;
re-starting the motor and producing a reversed air flow; and
vacuuming the particulates out of the housing.

8. The method of operating an automated air filter cleaning system according to claim 7, further comprising:
delivering more power to the motor as the air flow lessens due to the particulates in the air filter such that the air flow is maintained above the predetermined low point; and
delivering less power to the motor as the air flow increases due to a lack of particulates in the air filter such the air flow is maintained below the predetermined high point.

9. The method of operating an automated air filter cleaning system according to claim 7, further comprising initiating the air filter cleaning system to remove the particulates from the respective air filter with a single, central vacuum source applying a vacuum only to the respective housing while continuing to maintain the air flow through each one of the other housings.

\* \* \* \* \*